(12) United States Patent
Yagihashi et al.

(10) Patent No.: US 11,745,108 B2
(45) Date of Patent: Sep. 5, 2023

(54) INFORMATION PROCESSING SYSTEM, COMPUTER-READABLE NON-TRANSITORY STORAGE MEDIUM HAVING INFORMATION PROCESSING PROGRAM STORED THEREIN, INFORMATION PROCESSING APPARATUS, AND INFORMATION PROCESSING METHOD

(71) Applicant: NINTENDO CO., LTD., Kyoto (JP)

(72) Inventors: Ryota Yagihashi, Kyoto (JP); Yuji Ohashi, Kyoto (JP); Kouhei Maeda, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 17/147,961

(22) Filed: Jan. 13, 2021

(65) Prior Publication Data

US 2021/0236934 A1 Aug. 5, 2021

(30) Foreign Application Priority Data

Jan. 30, 2020 (JP) .................................. 2020-013828

(51) Int. Cl.
*A63F 13/58* (2014.01)
*A63F 13/792* (2014.01)
(Continued)

(52) U.S. Cl.
CPC .............. *A63F 13/58* (2014.09); *A63F 13/48* (2014.09); *A63F 13/49* (2014.09); *A63F 13/69* (2014.09); *A63F 13/792* (2014.09); *A63F 13/825* (2014.09)

(58) Field of Classification Search
None
See application file for complete search history.

(56) References Cited

U.S. PATENT DOCUMENTS 8,172,229 B2 * 5/2012 Kaji ....................... A63F 13/45
463/40
9,530,249 B2 * 12/2016 Kawamoto ............... G06T 7/73
(Continued)

OTHER PUBLICATIONS

Nintendo Co., Ltd., "Fire Emblem Heroes : Summoner Support: A Bond between Player and Hero" , [online] , searched on Jan. 20, 2020] , Internet (URL : https://new-guide.fireemblem-heroes.com/ja/feh-2090.html) , Corresponding to English (URL : https://new-guide.fireemblem-heroes.com/en-US/feh-2090.html) , 10 pages.

*Primary Examiner* — Reginald A Renwick
(74) *Attorney, Agent, or Firm* — Nixon & Vanderhye P.C.

(57) ABSTRACT

In the case where a maximum number of valid objects that is a number equal to or less than a maximum number of designation objects is decreased from a first number that is equal to or greater than 2 to a second number that is equal to or greater than 1, the second number of the valid objects is maintained, and the valid objects, the number of which is a number by which the second number is exceeded, are changed to invalid objects. An individual parameter that is changed in accordance with game play is associated with each object. In the case where designation of a designation object is cancelled, the individual parameter thereof is set to an initial value. In the case where change to a valid object is made after change to an invalid object, the individual parameter immediately before being changed to the invalid object is maintained.

17 Claims, 13 Drawing Sheets

(51) Int. Cl.
    *A63F 13/69*     (2014.01)
    *A63F 13/49*     (2014.01)
    *A63F 13/825*     (2014.01)
    *A63F 13/48*     (2014.01)

(56) References Cited

U.S. PATENT DOCUMENTS

| | | | | |
|---|---|---|---|---|
| 2004/0157662 | A1* | 8/2004 | Tsuchiya | A63F 13/5378 |
| | | | | 463/32 |
| 2012/0094751 | A1* | 4/2012 | Reynolds | A63F 13/822 |
| | | | | 463/29 |
| 2019/0220089 | A1* | 7/2019 | Kakizawa | A63F 13/807 |

\* cited by examiner

402

| CHARACTER ID | BASIC PARAMETER INFORMATION | IMAGE DATA |
|---|---|---|
| 0001 | ····· | ···· |
| 0002 | ····· | ···· |
| 0003 | ····· | ···· |
| 0004 | ····· | ···· |
| ⋮ | ⋮ | ⋮ |

| FRAME NUMBER | VALID FLAG | DESIGNATION CHARACTER INFORMATION | SPECIAL RELATIONSHIP LEVEL INFORMATION |
|---|---|---|---|
| 1 | ON | 0010 | Lv.3 |
| 2 | OFF | 0020 | Lv.2 |
| 3 | OFF | EMPTY | Lv1 |

INFORMATION PROCESSING SYSTEM, COMPUTER-READABLE NON-TRANSITORY STORAGE MEDIUM HAVING INFORMATION PROCESSING PROGRAM STORED THEREIN, INFORMATION PROCESSING APPARATUS, AND INFORMATION PROCESSING METHOD

CROSS REFERENCE TO RELATED APPLICATION

This application claims priority to Japanese Patent Application No. 2020-013828 filed on Jan. 30, 2020, the entire contents of which are incorporated herein by reference.

FIELD

The exemplary embodiments relate to information processing for causing a game to proceed using a plurality of characters owned by a user.

BACKGROUND AND SUMMARY

Hitherto, games that proceed using a plurality of characters owned by a user have been known. In addition, among such games, a game in which, when one character is designated and the game is caused to proceed, a "bond level" with the character is increased and the status of the character is increased in accordance with the bond level, has also been known. In addition, in this case, when the character to be designated is changed, the bond level of the character is reset.

In the above-described game, the case where the number of characters that can be designated (designation possible number) is increased/decreased is considered. In such a case, there is room for improvement in handling the originally designated character such that it is not as disadvantageous to the user as possible, when the designation possible number has been decreased.

Therefore, it is an object of the exemplary embodiments to provide an information processing system, a non-transitory computer-readable storage medium having an information processing program stored therein, an information processing apparatus, and an information processing method that are capable of, when the number of in-game objects (characters or the like) that can be designated is decreased, effectively using an in-game object designated before the decrease.

In order to attain the object described above, for example, the following configuration examples are exemplified.

A configuration example is directed to a processing system including a processor and a memory coupled thereto, the processor being configured to control the processing system to at least: storing an in-game object designated as a designation object, among a plurality of in-game objects used by a user in a game; determining a maximum designation number that is a maximum number of the in-game objects that can be designated as the designation object; determining at least one in-game object as the designation object under a condition that the number of the designation objects is equal to or less than the maximum designation number; storing whether the designation object is a valid object for which a predetermined state is valid or an invalid object for which the predetermined state is invalid; determining a maximum valid number that is a maximum number of the valid objects and is equal to or less than the maximum designation number; determining at least one designation object as the valid object under a condition that the number of the valid objects is equal to or less than the maximum valid number; associating an individual parameter with each of the valid object and the invalid object, and changing the individual parameter associated with the valid object, in accordance with play of the game; and changing the designation object to a non-designation object that is the in-game object that is not the designation object.

In the above configuration, in the determining the valid object, in the case where the maximum valid number is decreased from a first number that is equal to or greater than 2 to a second number that is equal to or greater than 1, the processor is configured to control the processing system to maintain the second number of the valid objects as the valid objects and change the valid objects, the number of which is a number by which the second number is exceeded, to the invalid objects. Moreover, in the changing the individual parameter, in the case where the designation object is changed to the non-designation object, the processor is configured to control the processing system to change the individual parameter associated with the non-designation object to an initial value or change the individual parameter such that the individual parameter is close to the initial value. Furthermore, in the case where the valid object is changed to the invalid object and the invalid object is then changed to the valid object, the processor is configured to control the processing system to maintain the individual parameter associated with the valid object immediately before being changed to the invalid object.

According to the above configuration example, in the case where the number of the in-game objects that can be designated can be increased/decreased, even when the number is decreased after being increased, the designated in-game object corresponding to the reduced amount can be effectively used.

In another configuration example, the processor may be further configured to control the processing system to change a second in-game object from the invalid object to the valid object on a condition that a first in-game object is changed from the valid object to the invalid object.

According to the above configuration example, since the invalid object and the valid object can be replaced with each other, the invalid object can be switched to the valid object and used.

In another configuration example, the processor may be further configured to control the processing system to, in the case where the in-game object is the valid object, cause an effect that is more advantageous in the game than in the case where the in-game object is any of the non-designation object and the invalid object, to occur for the valid object.

According to the above configuration example, the effect that is advantageous in the game can be caused to occur by designation as the valid object. Therefore, motivation to designate the in-game object as the valid object can be provided to the user.

In another configuration example, when changing the individual parameter, in the case where the in-game object is the invalid object, in accordance with play of the game, the processor may be configured to control the processing system not to change the individual parameter associated with the invalid object, or to change the individual parameter such that the change is smaller than that in the case where the in-game object is the valid object.

According to the above configuration example, in the case of the invalid object, the individual parameter is not changed or an amount of change thereof is smaller than that in the case of the valid object. Thus, the usefulness of designation as a valid object can be enhanced.

In another configuration example, the processor may be further configured to control the processing system to change a set display order in a predetermined screen of the valid objects on the basis of a predetermined user input, and, when determining the valid object, in the case where the maximum valid number is decreased from the first number to the second number, the processor may be configured to control the processing system to change the valid object in a specific display order to the invalid object.

According to the above configuration example, the user is allowed to recognize in advance that designated in-game objects may become invalid objects. Accordingly, the user is allowed to designate an in-game object desired to be handled as a valid object, in an order in which there is no possibility that the in-game object becomes an invalid object, so that the time and effort of the user for an operation for switching of valid/invalid can be reduced.

In another configuration example, the processor may be further configured to control the processing system to receive a user input for changing the invalid object to the valid object.

According to the above configuration example, the change of the invalid object to the valid object can be based on a user input. Accordingly, change from the invalid object to the valid object by the user's intention is possible.

In another configuration example, the processor may be configured to control the processing system to determine at least one designation object under a condition that a designation possible number of the designation objects is equal to or less than the maximum designation number and equal to or less than the maximum valid number, and the designation possible number is the number of the in-game objects that can be designated as the designation object.

In another configuration example, the processor may be configured to control the processing system to increase the maximum valid number on a condition that a compensation parameter is consumed by the user.

According to the exemplary embodiments, in the case where the number of the in-game objects that can be designated can be increased/decreased, when the number is decreased after being increased, the in-game object designated before the decrease can be effectively used.

These and other objects, features, aspects, and advantages of the exemplary embodiments will become more apparent from the following detailed description of non-limiting example embodiments when taken in conjunction with the accompanying drawings.

DETAILED DESCRIPTION OF NON-LIMITING EXAMPLE EMBODIMENTS

Figure 1:
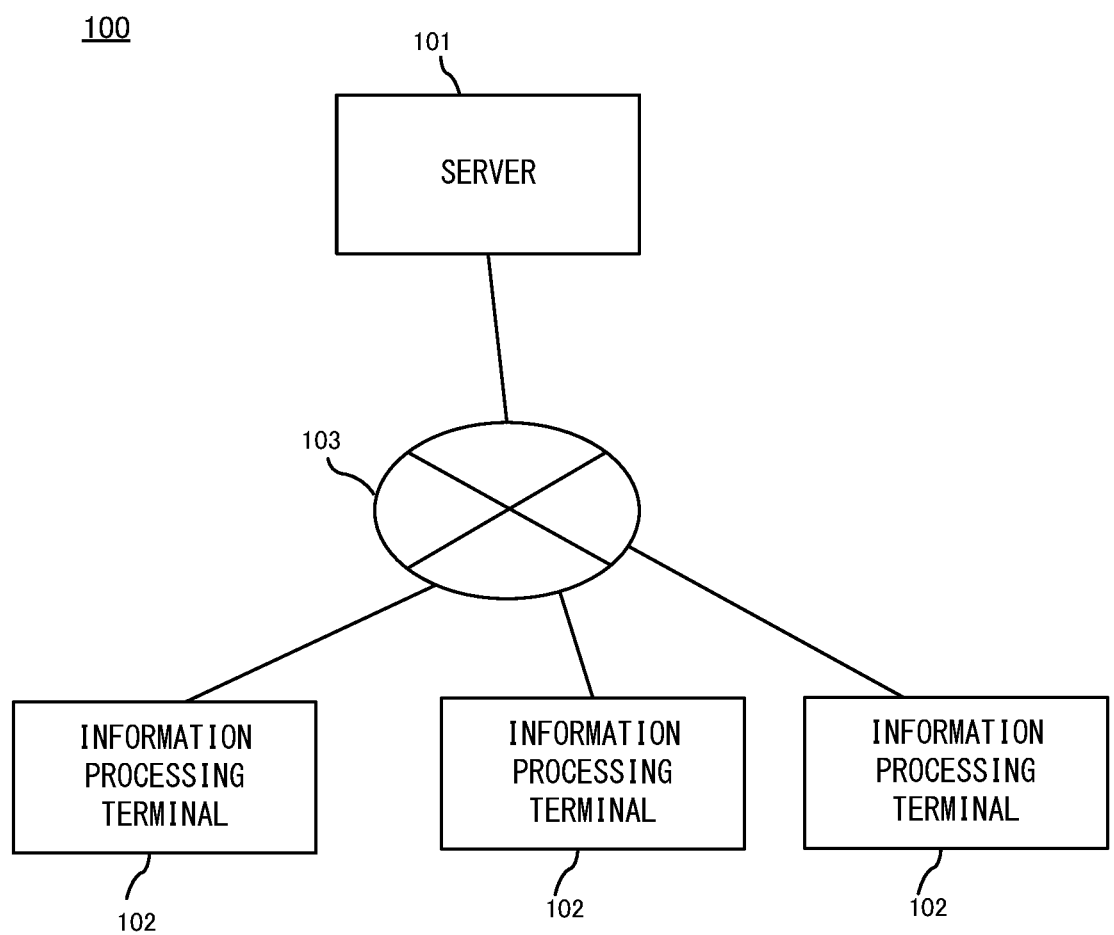
FIG. 1 is a schematic diagram showing a non-limiting example of the entire structure of an information processing system according to an exemplary embodiment.

Hereinafter, one exemplary embodiment will be described. It is to be understood that, as used herein, elements and the like written in a singular form with a word "a" or "an" attached before them do not exclude those in the plural form. FIG. 1 is a schematic diagram showing a non-limiting example of the entire configuration of an information processing system according to the exemplary embodiment. An information processing system 100 of the exemplary embodiment includes a server 101 and a plurality of information processing terminals 102. The server 101 and each information processing terminal 102 are configured to be able to communicate with each other via the Internet 103. In the exemplary embodiment, with such a configuration, information processing is executed. Hereinafter, a description will be given with game processing as an example of the information processing. Specifically, game processing for which a game program is installed on the information processing terminal 102 and which is executed while communication with the server 101 is being performed as necessary, will be described as an example.

[Hardware Configuration of Server]

Figure 2:
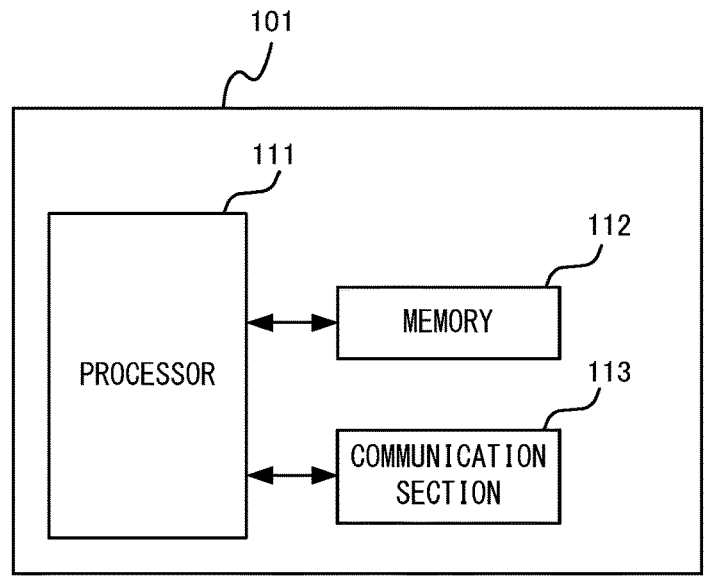
FIG. 2 is a block diagram showing a non-limiting example of the hardware configuration of a server 101.

Next, the hardware configuration of the server 101 will be described. FIG. 2 is a block diagram showing a non-limiting example of the hardware configuration of the server 101. The server 101 includes at least a processor 111, a memory 112, and a communication section 113. The processor 111 executes various programs for controlling the server 101. In the memory 112, various programs to be executed by the processor 111 and various kinds of data to be used by the processor 111 are stored. The communication section 113 connects to a network by means of wired or wireless communication and transmits/receives predetermined data to/from each information processing terminal 102 or another server (not shown).

[Hardware Configuration of Information Processing Terminal]

Figure 3:
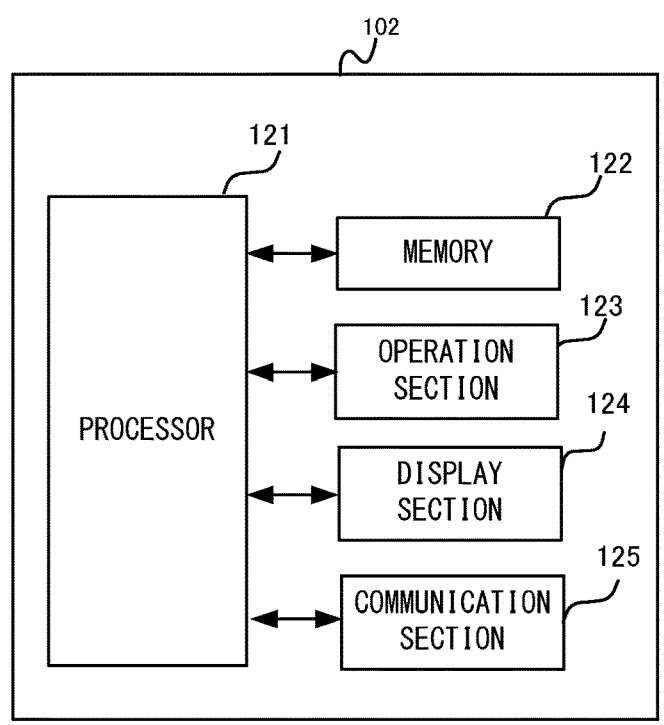
FIG. 3 is a block diagram showing a non-limiting example of the hardware configuration of an information processing terminal 102.

FIG. 3 is a block diagram showing a non-limiting example of the hardware configuration of the information processing terminal 102 in which game processing according to the exemplary embodiment is executed. Here, in the exemplary embodiment, for example, a smart device such as a smartphone and a tablet, a game apparatus such as a stationary game apparatus and a hand-held game apparatus, a personal computer, or the like is assumed as the information processing terminal 102. In the description of the exemplary embodiment, an information processing terminal (for example, a smartphone) including a display screen and a touch panel that are integrated with each other will be described as an example. Therefore, input operations are mainly inputs to the touch panel. However, in another exemplary embodiment, for input operation, a physical controller connected to the information processing terminal 102 wirelessly or via wire may be employed, or for example, an input apparatus formed integrally with the information processing terminal 102 may be employed.

In FIG. 3, the information processing terminal 102 includes a processor 121, a memory 122, an operation section 123, a display section 124, and a communication section 125. The processor 121 executes later-described game processing or executes a system program (not shown) for controlling overall operation of the information processing terminal 102, thereby controlling operation of the information processing terminal 102. The processor 121 may include a single processor or a plurality of processors. In the memory 122, various programs to be executed by the processor 121 and various kinds of data to be used in the programs are stored. The memory 122 is, for example, a flash EEPROM or a hard disk device. The operation section 123 is an input device for receiving an operation from a user, and a touch panel is mainly assumed as the operation section 123 in the exemplary embodiment. In another exemplary embodiment, the operation section 123 may be various pointing devices, various press-type buttons, an analog stick, and the like. The display section 124 is typically a liquid crystal display device. The communication section 125 connects to the network by means of wired or wireless communication and transmits/receives predetermined data to/from the server 101.

[Outline of Game Processing According to Exemplary Embodiment]

Hereinafter, the outline of game processing executed in the exemplary embodiment will be described. A game assumed in the exemplary embodiment is a game that proceeds using a plurality of in-game objects owned by a user. As an example of such a game, a simulation role-playing game (hereinafter, SRPG) is assumed in the exemplary embodiment. In the game, an "own army" operated by a player and an "enemy army" operated by a computer battle against each other under a turn-based simulation method (hereinafter, in the game, a scene in which the game proceeds under this method is referred to as an SLG part). In addition, in this game, "characters" having a human motif are mainly used as the in-game objects (in another exemplary embodiment, robots, animals, etc., may be used as in-game objects). In this game, the plurality of characters owned by the user are used as "pieces" in the SLG part. The user moves each character on a map composed of a predetermined number of squares to battle against a character of the enemy army. Moreover, when characters battle against each other one-on-one, a battle animation can also be displayed as a battle scene representation. As for a method for acquiring these characters, the character can be acquired by satisfying a predetermined condition such as the progress of a scenario of the game reaching a predetermine value. In addition, the character can also be acquired by executing a predetermined random selection process.

Hereinafter, a character corresponding to the player themselves is referred to as a "player character", and the other characters are referred to as "fellow characters".

In this game, it is possible to set a "special relationship" between the player character and a predetermined fellow character. This special relationship is an element having a motif of human emotional connection, such as trust, friendship, intimacy, and bond. In this game, up to three predetermined fellow characters (described in detail later) can be designated as partners for which the special relationship is set. Hereinafter, these designated characters are referred to as designation characters. In a state where a designation character is designated, a growth element referred to as a "special relationship level" can be grown (increased) between the designation character and the player character by satisfying a predetermined condition in the game. The predetermined condition is, for example, defeating a predetermined number of enemy characters with the designation character in the above SLG part. The special relationship level is represented by, for example, a degree of reliability, a degree of intimacy, a friendship level, a bond level, and the like. In addition, during the game, specifically in the above SLG part, as the special relationship level is higher, a predetermined effect (hereinafter, referred to as an advantageous effect) that is more advantageous to the designation character in the game occurs. In the exemplary embodiment, a description will be given with an example in which an ability parameter (performance) of a designation character is improved as an example of the advantageous effect. In addition, as the special relationship level increases, the content of the advantageous effect (a value by which the ability parameter is improved) also increases. That is, by setting a predetermined fellow character as a designation character, it is possible to improve the performance of the fellow character more than usual and use the fellow character in the game. Furthermore, by continuously using this character, it is possible to grow the special relationship level and enhance the performance improvement effect. The processing according to the exemplary embodiment is mainly processing related to setting such a special relationship.

In another exemplary embodiment, the special relationship is not limited to a relationship having a motif of human emotional connection and may be a relationship having a motif of another matter. The special relationship may be any relationship as long as it has a growth element as described above.

Figure 4:
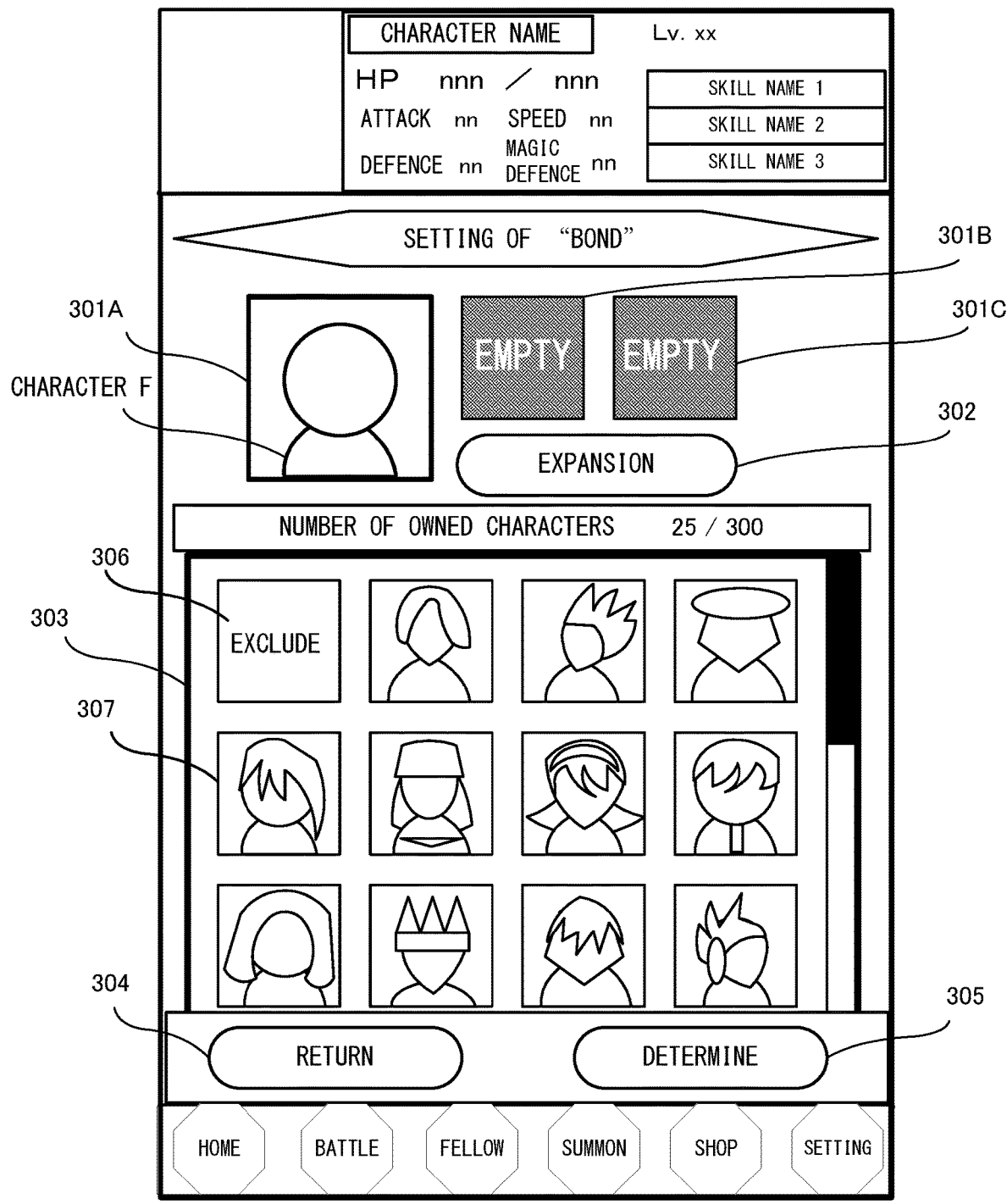
FIG. 4 illustrates a non-limiting example of a game screen.

Hereinafter, an example of a process of setting the above special relationship in this game will be described using screen examples. FIG. 4 illustrates an example of a screen for setting the special relationship (hereinafter, a special relationship setting screen). This screen is displayed when the player performs an operation for displaying the special relationship setting screen in a predetermined game menu. In FIG. 4, three designation frames 301 that are designation frames 301A, 301B, and 301C are displayed in order from the left. In addition, an expansion button 302, a fellow list display area 303, a return button 304, and a determination button 305 are also displayed.

FIG. 4 shows the three designation frames 301, but, in this game, only one of the three designation frames 301 can be used in the initial state. Specifically, it is possible to use only the designation frame 301A in the initial state. In addition, the designation frame 301A is displayed with a larger size than the other two frames. FIG. 4 shows that the designation frame 301A is in a valid (usable) state and the designation frames 301B and 301C are in an invalid state. Moreover, in FIG. 4, in order to indicate that the designation frames 301B and 301C are in an invalid state, for example, the designation frames 301B and 301C are grayed out. In addition, in the initial state, each of the three designation frames 301 is in a state where nothing is designated therein (hereinafter, an empty frame state). FIG. 4 shows an example in which a fellow character F that is a predetermined fellow character has already been designated in the designation frame 301A. In addition, a character of "empty" indicating an empty frame state is shown in each of the designation frames 301B and 301C.

The fellow list display area 303 is a scrollable display area in which the fellow characters owned by the user are displayed in a list format. In the fellow list display area 303, an "exclude" icon 306 is displayed at the upper left corner thereof, and a plurality of fellow icons 307 indicating the respective fellow characters can be displayed in the remaining area. The determination button 305 is a button for fixing the designation contents of the designation frames 301. The return button 304 is a button for closing (ending) the special relationship setting screen without fixing the designation contents of the designation frames 301.

Here, an example of operations for designating a character in the designation frame 301 and cancelling the designation will be described. An example of operations for designation and cancellation with respect to the designation frame 301A will be described. First, when the designation frame 301A is in an empty frame state, the user can designate a desired fellow character in the fellow list display area 303 as a designation character in the designation frame 301A by performing an operation of dragging and dropping this fellow character onto the designation frame 301A. In the fellow list display area 303, a fellow icon 307 for a designation character is grayed out in order to indicate that the designation character is currently designated. In addition, in the case of a state where a certain fellow character has already been designated in the designation frame 301A (the state of FIG. 4), a character to be designated can be overwritten by the same operation (at this time, a confirmation message for overwriting or the like is also displayed as appropriate). Next, a cancellation operation will be described. In this case, the user initially performs a tap operation on the designation frame 301A. Accordingly, the designation frame 301A becomes selected. Thus, by performing a tap operation on the "exclude" icon 306 in this state, the designation in the designation frame 301A can be cancelled, and the designation frame 301A can be brought into an empty frame state. In addition to the above, the designation can be cancelled by dragging and dropping the "exclude" icon 306 in the same manner as above.

Next, validating the designation frame 301 that is in an invalid state will be described. In this game, the designation frames 301B and 301C, which are in an invalid state, can be validated by satisfying a predetermined condition. In this game, the predetermined condition is subscription to a predetermined subscription service. For example, the predetermined condition is subscription to a monthly fee subscription service. Accordingly, during a valid period of the subscription service, all the three designation frames 301 can be used. If the valid period of the subscription service ends due to, for example, a monthly fee being unpaid, the designation frames 301B and 301C return to an invalid state. That is, in this game, a period during which all the three designation frames 301 can be valid is a limited period. Hereinafter, the period during which the subscription service is valid and it is possible to use all the three designation frames 301 is referred to as a "frame expansion valid period", and the period during which the subscription service is not valid is referred to as a "normal period".

The expansion button 302 is a button that is displayed in the case of the normal period. For example, when the user performs a tap operation on the expansion button 302, a transition is made to a guide screen for the subscription service. The user can perform an operation of subscribing to the subscription service, in the screen. In the exemplary embodiment, an example in which the designation frames 301B and 301C are automatically validated by subscribing to the subscription service will be described. However, in another exemplary embodiment, automatic validation is not performed, and an explicit instruction operation of the user by operating the expansion button 302 may be requested. That is, in addition to subscribing to the subscription service, the designation frames 301B and 301C may be validated at a timing when the user subsequently operates the expansion button 302.

Figure 5:
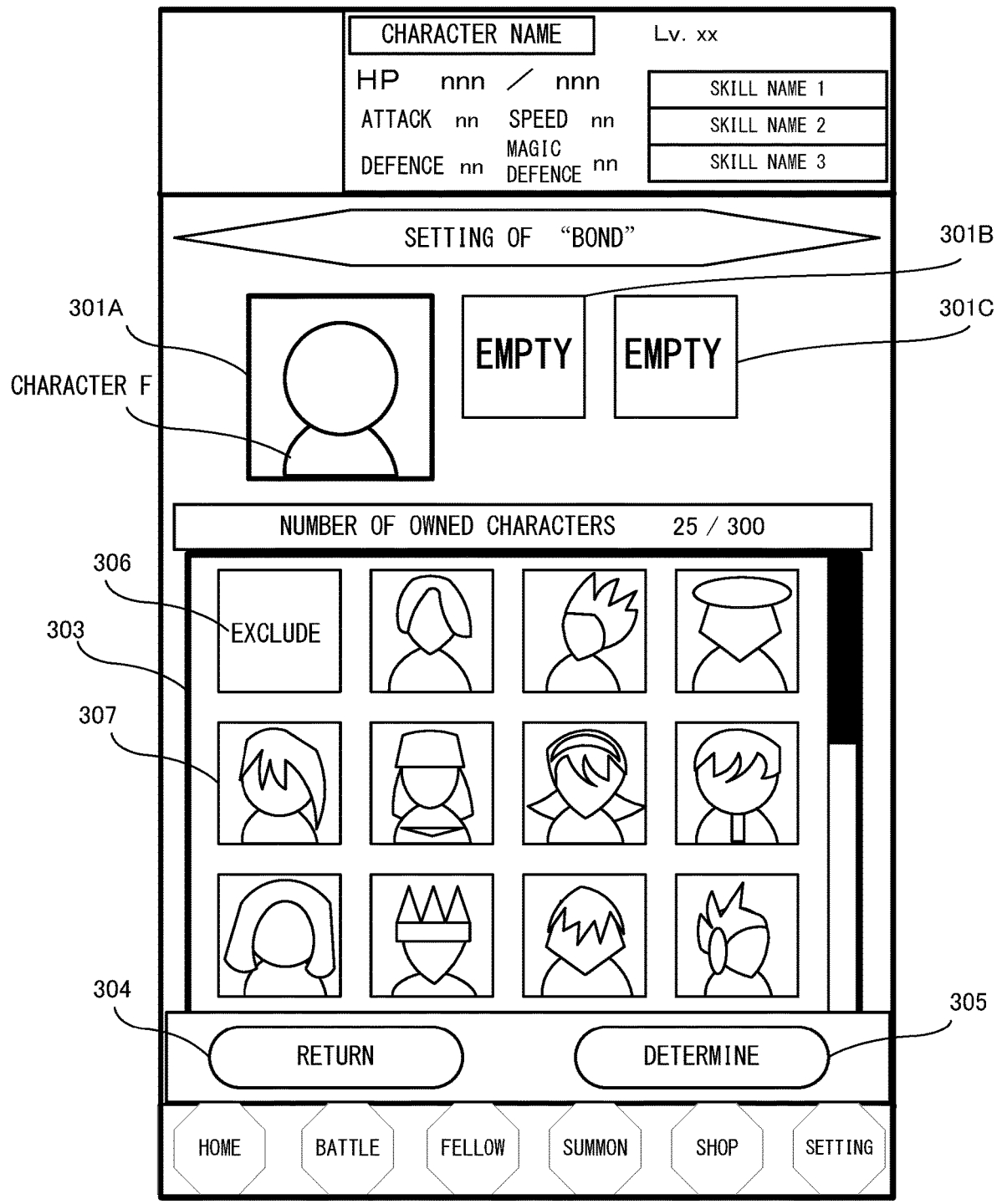
FIG. 5 illustrates a non-limiting example of a game screen.
Figure 6:
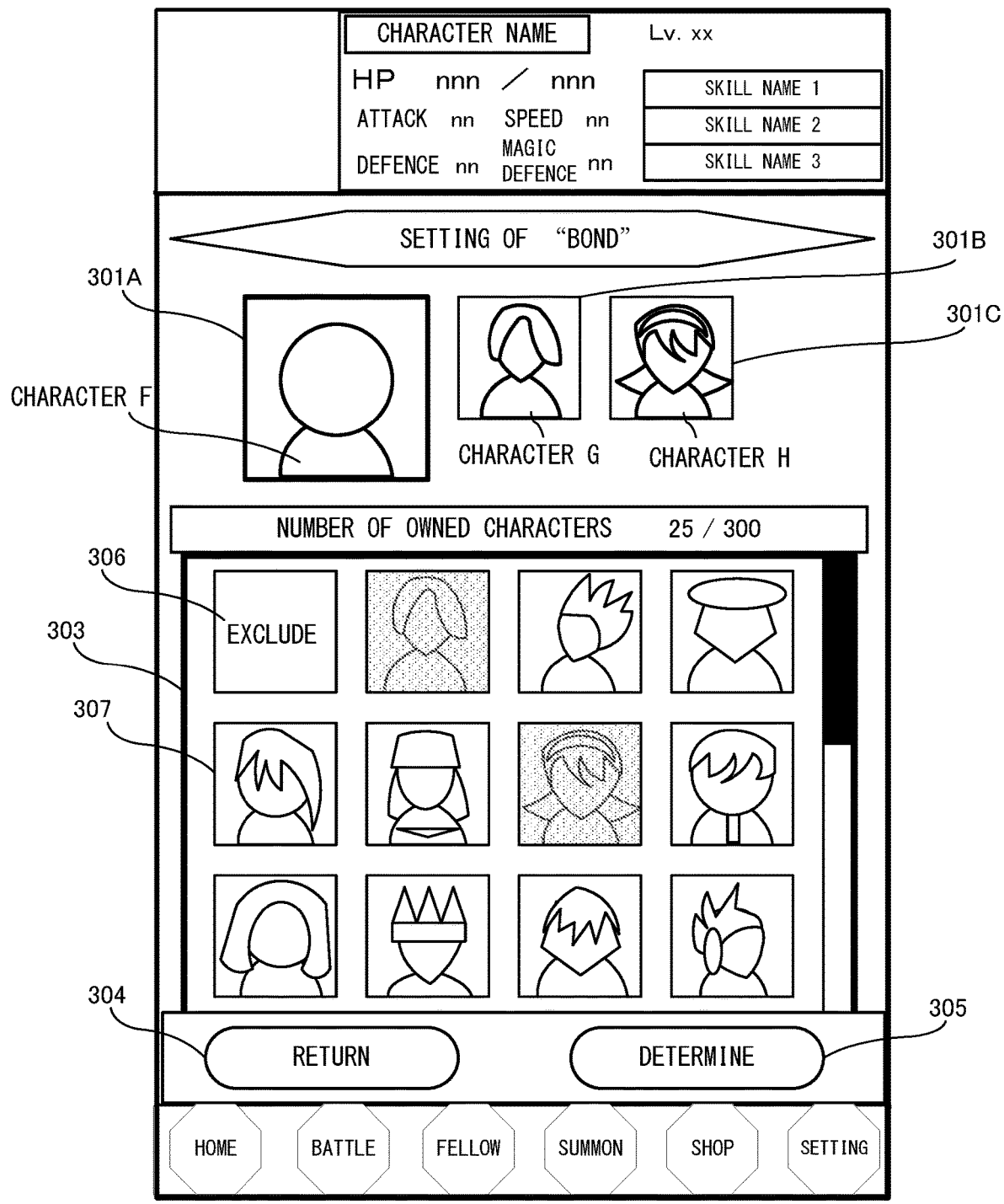
FIG. 6 illustrates a non-limiting example of a game screen.

FIG. 5 illustrates an example of the special relationship setting screen in the frame expansion valid period. Unlike FIG. 4, FIG. 5 shows that the designation frames 301B and 301C (both of which are in an empty frame state) are in a valid state. In addition, the expansion button 302 is not displayed in FIG. 5. The user can perform operations for designating a predetermined fellow character and cancelling the designation with respect to the designation frames 301B and 301C, in such a screen. Specific operations are the same as in the case of the designation frame 301A. FIG. 6 shows a screen example in a state where fellow characters have been designated in all the three designation frames 301. FIG. 6 shows an example in which the fellow character F has been designated in the designation frame 301A, a fellow character G has been designated in the designation frame 301B, and a fellow character H has been designated in the designation frame 301C. A designated fellow character is grayed out in the fellow list display area 303 to indicate that the fellow character has been designated. In the following description, a fellow character designated in the designation frame 301A is referred to as a first designation character, a fellow character designated in the designation frame 301B is referred to as a second designation character, and a fellow character designated in the designation frame 301C is referred to as a third designation character. In addition, a designation character designated in a designation frame 301 that is in a valid state is sometimes referred to as a valid character, and a designation character designated in a designation frame 301 that is in an invalid state is sometimes referred to as an invalid character.

Figure 7:
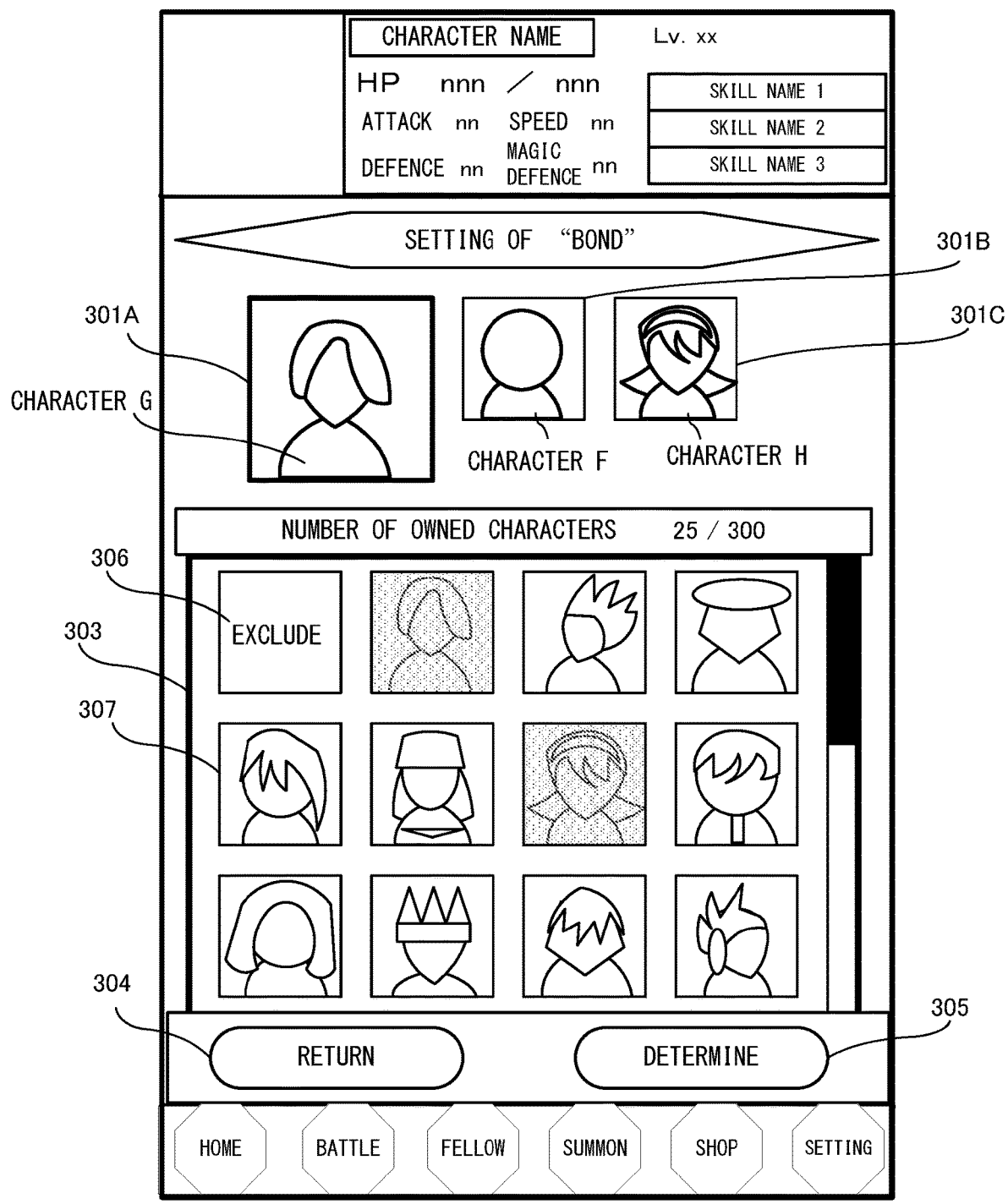
FIG. 7 illustrates a non-limiting example of a game screen.

Furthermore, in this game, when the three designation frames 301 are in a valid state as described above, it is possible to replace designation characters between the three designation frames 301. For example, the case of replacing the fellow character F, which is the first designation character, with the fellow character G, which is the second designation character, in FIG. 6 is assumed. In this case, for example, the user performs an operation of dragging and dropping the first designation character onto the designation frame 301B. Accordingly, a state where the fellow character G is designated as the first designation character and the fellow character F is designated as the second designation character as shown in FIG. 7, can be obtained. Then, by the user performing a tap operation on the determination button 305 after performing each of such operations for designation, replacement, and cancellation, these setting contents are fixed.

Here, a supplemental description of the special relationship level will be given. In this game, the above-described special relationship level is managed for each designation character. When the three designation characters have been designated as described above, the special relationship level is individually managed for each of the fellow character F, the fellow character G, and the fellow character H. In addition, each special relationship level is reset by cancelling the designation of the designation character. For example, when the designation of a designation character whose special relationship level has been increased to "5" is cancelled, the special relationship level is initialized (for example, set to level 1). Thus, even when this character is designated again after the cancellation, the special relationship level is increased again from the beginning (level 1). It should be noted that the special relationship level is initialized when cancellation is performed on the designation frame 301. Thus, when an operation of replacing designation characters between designation frames is performed as described above without performing a cancellation operation, the special relationship level is maintained. In the above example, the case of replacing the fellow character F, which is the first designation character and has a special relationship level of 5, with the fellow character G, which is the second designation character and has a special relationship level of 3, is assumed. In this case, the fellow character G having a special relationship level of 3 is designated as the first designation character, and the fellow character F having a special relationship level of 5 is designated as the second designation character.

Figure 8:
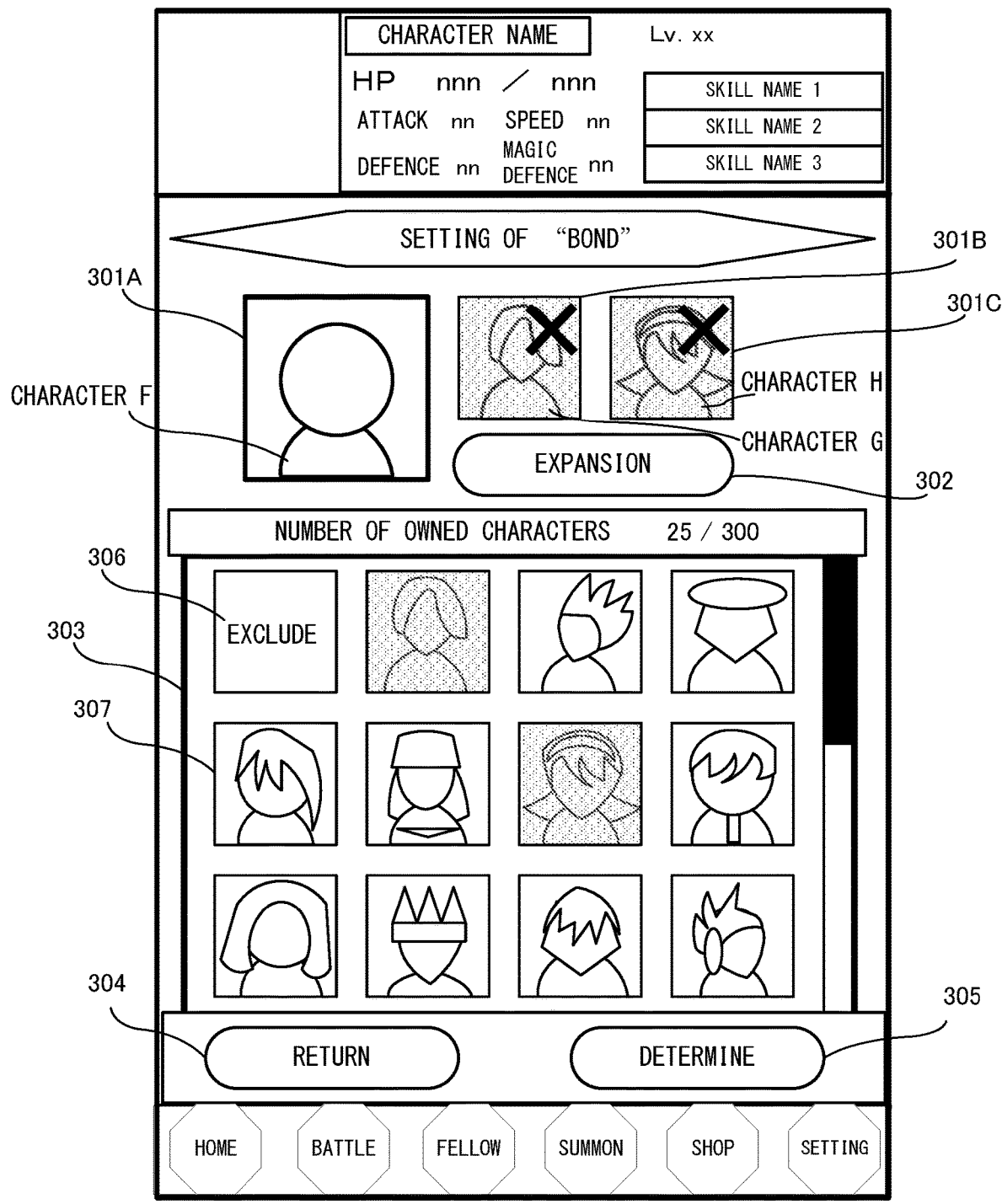
FIG. 8 illustrates a non-limiting example of a game screen.

Next, the case where the frame expansion valid period ends due to unsubscription or the like after subscription to the subscription service will be described. Specifically, the case where the frame expansion valid period ends in a state where designation characters have been designated in all the three designation frames 301, will be described. FIG. 8 shows an example of the special relationship setting screen in such a case. In FIG. 8, the designation frames 301B and 301C are grayed out, and an "x" mark is displayed at an upper right portion of each frame. Such a display indicates that the designation frames 301B and 301C in which designation characters have been designated are in an invalid state. That is, in this game, even when the frame expansion valid period ends, the designation contents of the designation frames 301B and 301C are not cancelled without permission, and the state where the designation characters have been designated is maintained. However, the above advantageous effect, which occurs as a result of designation as a valid character, is not applied to the invalid characters. In the example of FIG. 8, the second designation character (character G) and the third designation character (character H) are invalid characters. Thus, various kinds of game processing are executed such that the advantageous effect in the SLG part is not caused to occur for these two invalid characters. In addition, for these invalid characters, the special relationship level does not grow (unless the invalid characters are validated again).

The operations that can be performed by the user for the designation frames 301B and 301C in such a state are only an operation for cancelling the designation of the designation characters from the designation frames 301B and 301C and an operation for replacing the designation characters in the designation frames 301 with each other. These operations will be described. First, when the designation of the designation character is cancelled from the designation frame 301B or 301C that is in an invalid state, the cancelled designation frame 301 is brought into an "empty state". To designate a fellow character in this frame, it is necessary to subscribe to the subscription service again. That is, cancellation from the invalid designation frame 301 is possible, but, to designate a fellow character in this frame again, it is necessary to satisfy again the condition for validating the invalid designation frame 301.

Figure 9:
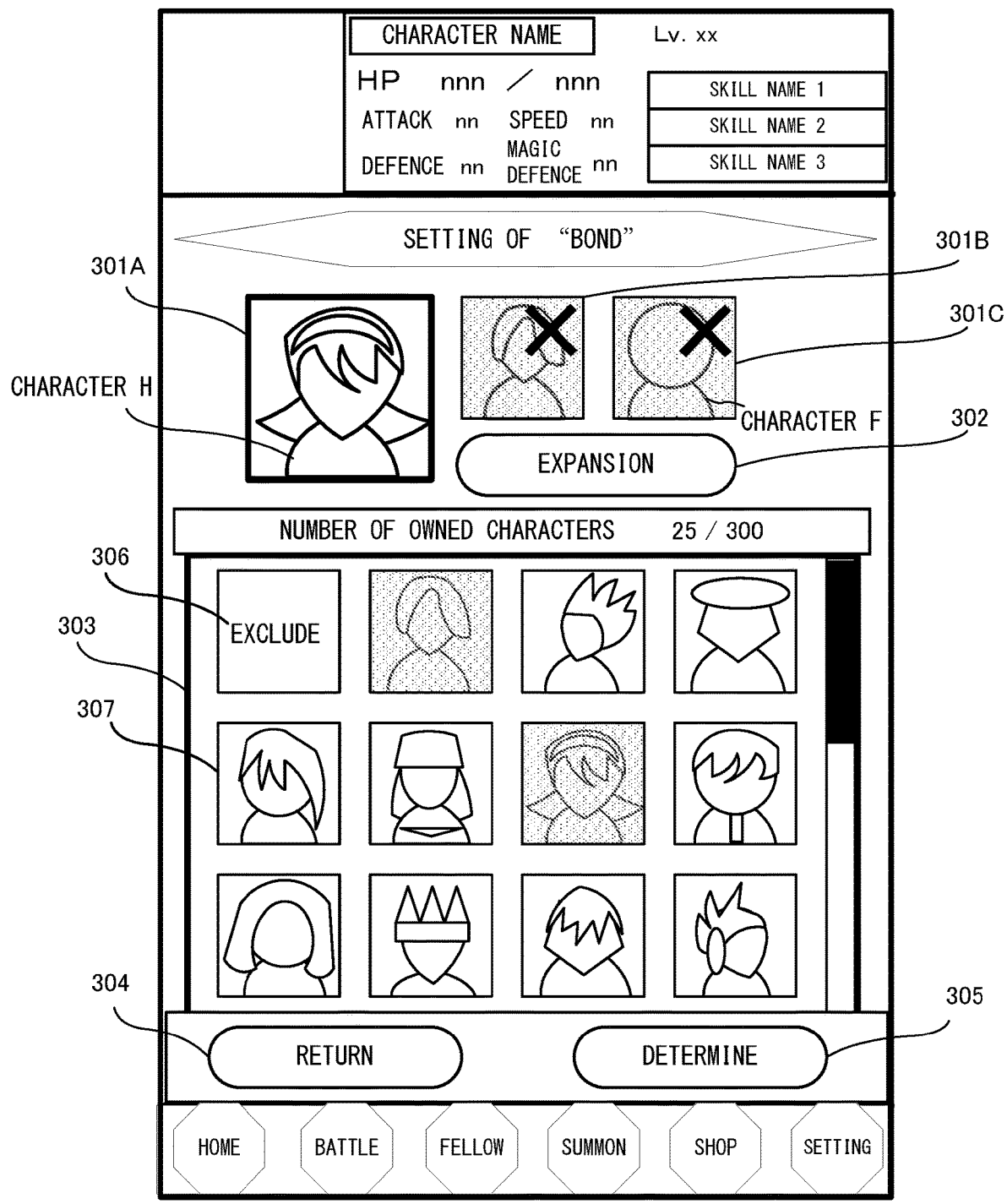
FIG. 9 illustrates a non-limiting example of a game screen.

Next, an operation for replacing the designation characters with each other in such a state will be described. In this game, even during the normal period, when certain fellow characters have been designated in the designation frames 301B and 301C, it is possible to replace the designation characters between the valid designation frame 301A and the invalid designation frames 301B and 301C. For example, the case of replacing the fellow character F, which is the first designation character, with the fellow character H, which is the third designation character, in the state of FIG. 8 is assumed. For example, the user performs an operation of dragging and dropping the fellow character F onto the designation frame 301C. In this case, by performing such a replacement operation, the fellow character H is designated as the first designation character, and the fellow character F is designated as the third designation character, as shown in FIG. 9. At this time, the fellow character H is designated as the first designation character with the special relationship level thereof being maintained at the level immediately before the normal period. Then, the advantageous effect based on this special relationship level also occurs. In addition, it becomes possible to grow the special relationship level. Meanwhile, as for the fellow character F designated as the third designation character, the fellow character F becomes an invalid character, and thus no longer receives the benefit of the advantageous effect. In addition, the special relationship level of the fellow character F is not initialized and is maintained, but does not grow any further.

In the exemplary embodiment, by enabling a replacement operation during the normal period as described above, strategic characteristics can be provided to the user. For example, the user designates certain fellow characters in the designation frames 301B and 301C during subscription to the subscription service. Accordingly, even during the subsequent normal period, unless an explicit operation for cancellation from the designing frame 301 is performed, it is possible to selectively use any one of the three designation characters in a state where the advantageous effect has occurred. Therefore, strategic characteristics are given to designation of a designation character in terms of which designation character is to be designated in the designation frame 301A, so that the entertainment characteristics of the game can be enhanced.

[Details of Game Processing According to Exemplary Embodiment]

Next, the game processing according to the exemplary embodiment will be described in more detail with reference to FIG. 10 to FIG. 16. In the following description, processing related to the special relationship setting screen will be described, and the description of other game processing is omitted.

[Data to be Used]

Figures 10, 11:
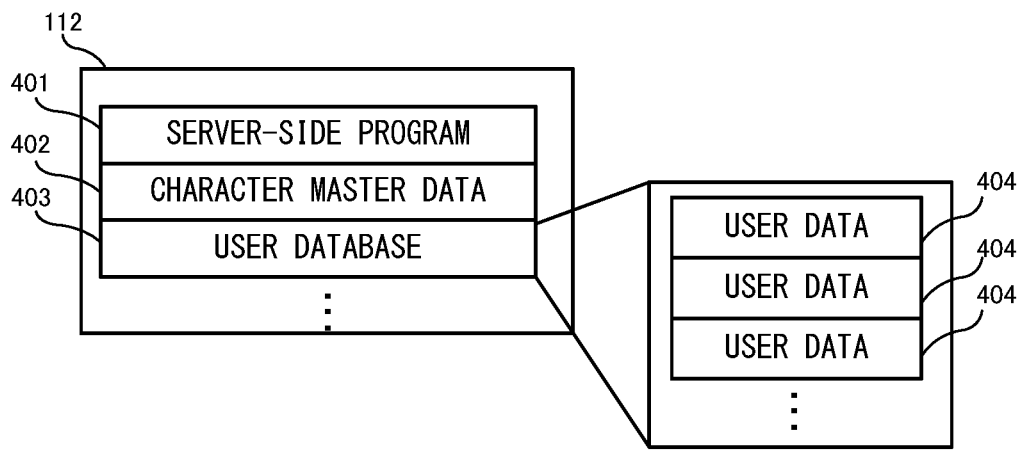
FIG. 10 illustrates a non-limiting example of data stored in a memory 112 of the server 101.
FIG. 11 illustrates a non-limiting example of the data structure of character master data 402.

First, various kinds of data to be used in the game processing will be described. First, data to be used in the server 101 will be described. FIG. 10 illustrates a memory map showing an example of various kinds of data stored in the memory 112 of the server 101. In the memory 112 of the server 101, a server-side program 401, character master data 402, a user database 403, etc., are stored.

The server-side program 401 is a program for executing the game processing according to the exemplary embodiment. The server-side program 401 is, for example, a program for executing a user log-in process and a process for transmitting various kinds of data required for the game processing, to the information processing terminal 102 as appropriate.

The character master data 402 is data that defines basic information of all the fellow characters that appear in this game. FIG. 11 illustrates an example of the data structure of the character master data 402. The character master data 402 shown in FIG. 11 is data in a table format including items such as a character ID 511, basic parameter information 512, and image data 513. The character ID 511 is an ID for uniquely identifying each fellow character. The basic parameter information 512 is information indicating initial values (for example, values at the time of level 1) of parameters (hit points, attacking power, etc.) of the fellow character. In addition, the basic parameter information 512 also includes information that defines the content of parameter increase (increase amount, growth table, etc.) that accompanies an increase in level. The image data 513 is data indicating an appearance image of the fellow character.

In the exemplary embodiment, occurrence of the advantageous effect (the effect of increasing the ability parameter) for the above-described designation character is realized by adding a predetermined value corresponding to the special relationship level, to the value indicated by the basic parameter information 512. In addition, the ability parameter may be increased in a manner of designating a multiplying factor in accordance with the special relationship level.

Referring back to FIG. 10, the user database 403 is a database that is a set of data on each user who plays the game according to the exemplary embodiment. In the exemplary embodiment, the user database 403 is a database in which later-described user data 404 is configured as one record. After a log-in process is performed, a process of acquiring the user data 404 corresponding to the user who has logged in, from the server 101, etc., are performed in the information processing terminal 102.

Figures 12, 13:
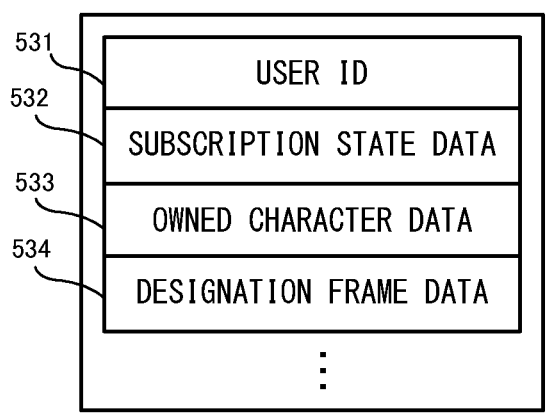
FIG. 12 illustrates a non-limiting example of the data structure of user data 404.
FIG. 13 illustrates a non-limiting example of the data structure of designation frame data 534.

The data structure of the user data 404 will be described with reference to FIG. 12. The user data 404 shown in FIG. 1 includes a user ID 531, subscription state data 532, owned character data 533, designation frame data 534, etc. The user ID 531 is an ID for uniquely identifying each user. The subscription state data 532 is information indicating whether the user has subscribed to the above-described subscription service. In other words, the subscription state data 532 is information for determining whether it is currently during the frame expansion valid period or during the normal period. In the exemplary embodiment, a monthly fee subscription service is assumed as described above. In addition, when a monthly fee has not been paid, an unsubscription process is automatically performed.

The owned character data 533 is data indicating the fellow characters owned by the user. Specifically, the owned character data 533 includes the character IDs 511 corresponding to the fellow characters owned by the user, etc.

The designation frame data 534 is data corresponding to the above-described designation frame 301. FIG. 13 illustrates an example of the data structure of the designation frame data 534. The designation frame data 534 is data in a table format including items such as a frame number 551, a valid flag 552, designation character information 553, and special relationship level information 554. In this example, since the case where the number of designation frames 301 is three is illustrated, the number of records included in the designation frame data 534 is three. The frame number 551 is a number for identifying any of the designation frames 301A, 301B, and 301C. In this example, numbers 1, 2, and 3 are assigned in the order of the designation frames 301A, 301B, and 301C. In addition, this order also indicates the display order of the designing frames 301 in the special relationship setting screen. In this example, the display order is assumed to be an order in which the designation frames 301 are aligned horizontally from the left side of the screen. The valid flag 552 is a flag indicating whether the designation frame 301 is in a valid state or in an invalid state. In this example, the valid flag 552 is set to be "ON" when the designation frame 301 is valid, and the valid flag 552 is set to be "OFF" when the designation frame 301 is invalid. That is, a fellow character designated in the designation frame 301 for which the valid flag 552 is ON is handled as a valid character. In addition, a fellow character designated in the designation frame 301 for which the valid flag 552 is OFF is handled as an invalid character. The designation character information 553 is information indicating whether the designation frame 301 is in the empty frame state. In addition, when the designation frame 301 is not in the empty frame state, the character ID 511 for specifying which fellow character has been designated in this frame is set. The special relationship level information 554 is information indicating the special relationship level of the designation character designated in this frame.

In addition to the above, although not shown, information on each user such as user profile information to be used for the log-in process is also included in the user data 404.

Figure 14:
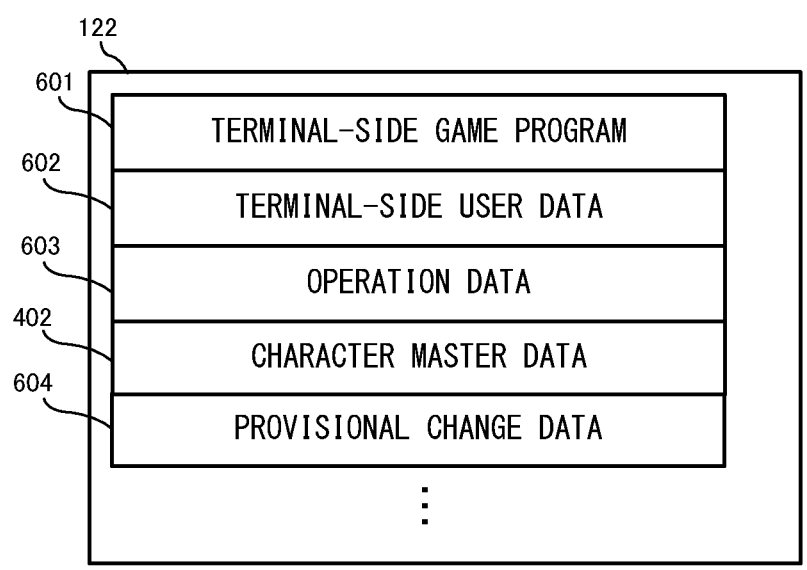
FIG. 14 illustrates a non-limiting example of data stored in a memory 122 of the information processing terminal 102.

Next, various kinds of data stored in the memory 122 of the information processing terminal 102 will be described. FIG. 14 illustrates a memory map showing an example of various kinds of data stored in the memory 122 of the information processing terminal 102. In the memory 122 of the information processing terminal 102, a terminal-side game program 601, terminal-side user data 602, operation data 603, the character master data 402, temporary change data 604, etc., are stored.

The terminal-side game program 601 is a program for executing the game processing according to the exemplary embodiment.

The terminal-side user data 602 is data obtained by copying the user data 404 corresponding to a user who plays this game using the information processing terminal 102, to the memory 122. The data structure of the terminal-side user data 602 is the same as the data structure shown in FIG. 12, and thus the description thereof is omitted. During game play, the terminal-side user data 602 is updated at a predetermined timing, and transmitted to the server 101 at a predetermined timing. In the server 101, a process of updating the user data 404 as appropriate is performed on the basis of the transmitted terminal-side user data 602.

The operation data 603 is data indicating the contents of operations performed by the user on the operation section 123, and is generated in a predetermined cycle.

The character master data 402 is data that is copied from the server 101 to the memory 122 at the start of this game.

The temporary change data 604 is data for temporarily storing the content of the designation frame 301 in a state where a change operation is performed therefor in the special relationship setting screen but the change has not yet been fixed (the determination button 305 has not been pressed). The data structure of the temporary change data 604 is the same as that of the designation frame data 534.

In addition to the above, in the memory 122, various kinds of working data to be used in the processing, etc., are also stored as appropriate.

[Details of Processing Executed by Processor 121]

Next, the game processing according to the exemplary embodiment will be described in detail. Here, processing related to the special relationship setting screen in the information processing terminal 102 (hereinafter, special relationship setting screen process) will be mainly described, and the detailed description of other game processing is omitted. In addition, processing in the server 101 will be additionally described as appropriate as necessary. It is assumed that, prior to these processes, the user data 404 corresponding to a user who has logged in is acquired from the server 101 and stored as the terminal-side user data 602 in the memory 122.

Figure 15:
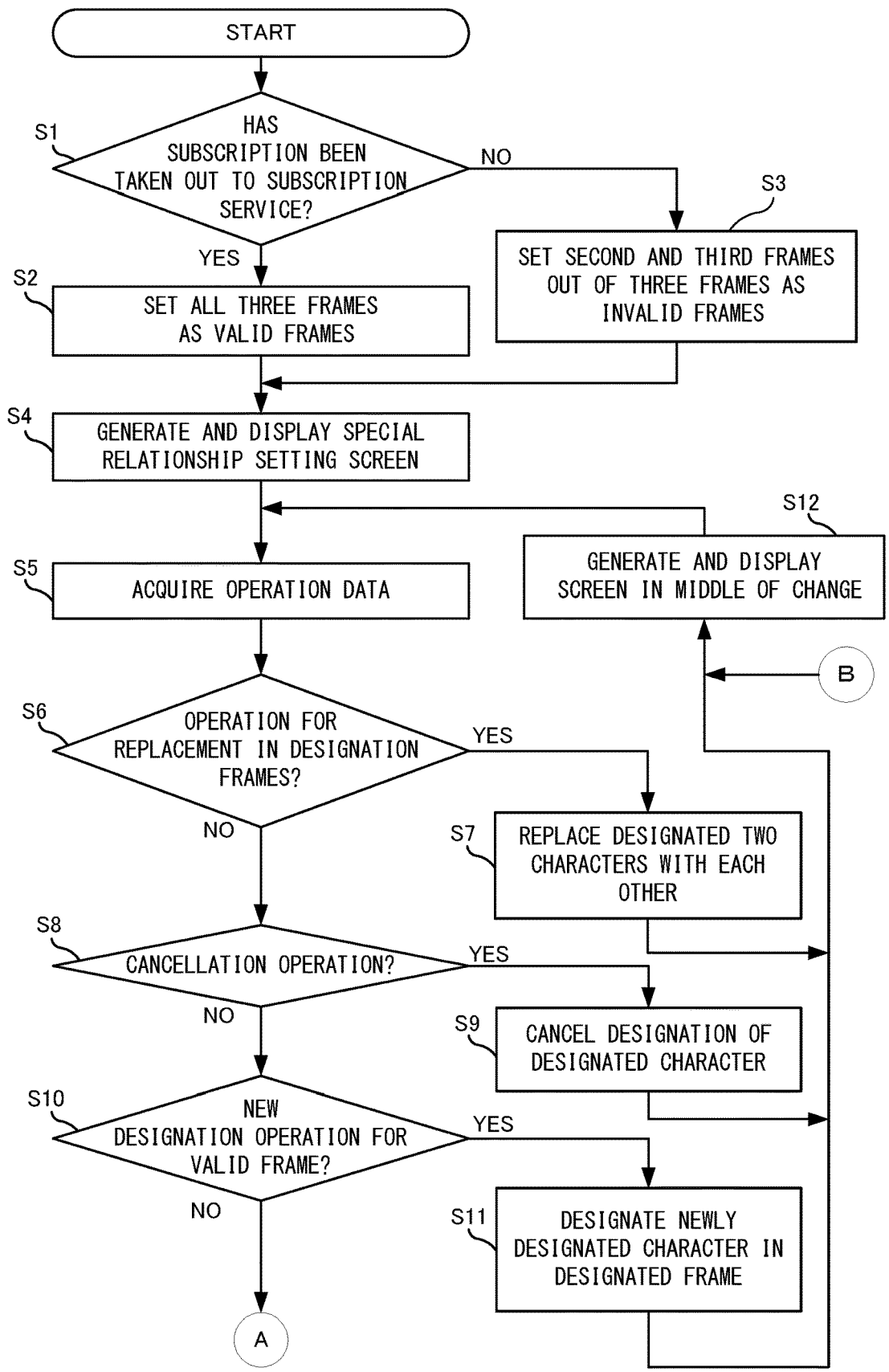
FIG. 15 is a flowchart showing a special relationship setting screen process.

FIG. 15 is a flowchart showing the special relationship setting screen process in detail. This process is started, for example, when the user performs a selection operation on a "special relationship setting" button (not shown) displayed in a predetermined game menu.

First, in step S1, the processor 121 refers to the subscription state data 532 and determines whether the current state is a state where the user has subscribed to the subscription service. That is, the processor 121 determines whether it is currently during the frame expansion valid period or during the normal period. As a result of the determination, when the user has subscribed to the subscription service (YES in step S1), in step S2, the processor 121 performs setting for making all the designation frames 301 valid. Specifically, the processor 121 sets all the valid flags 552 of the designation frame data 534 to be "ON". On the other hand, when the user has not subscribed to the subscription service (NO in step S1), in step S3, the processor 121 performs setting for making the designation frames 301B and 301C invalid. Specifically, the processor 121 sets the valid flags 552 corresponding to the designation frames 301B and 301C, to be "OFF".

Next, in step S4, the processor 121 generates a special relationship setting screen as described with reference to FIG. 4 to FIG. 9, and displays the special relationship setting screen on the display section 124. Specifically, the processor 121 refers to the designation frame data 534 and sets an image (an icon of a character, or a character of "empty") to be displayed on each designation frame 301. In addition, for the designation frame 301 that is in an invalid state, the processor 121 performs setting such that the designation frame 301 is grayed out as described above. Moreover, the processor 121 refers to the owned character data 533 and sets contents to be displayed in the fellow list display area 303. Furthermore, when the user has not subscribed to the subscription service, the processor 121 also performs setting such that the expansion button 302 is displayed. Then, the processor 121 generates a special relationship setting screen reflecting such display setting contents, and outputs the special relationship setting screen to the display section 124. Accordingly, a special relationship setting screen corresponding to the current designation contents of the designation frames 301 and whether it is currently during the frame expansion valid period or during the normal period, is displayed. Moreover, along with this process, the processor 121 copies the contents of the designation frame data 534 at this time to the provisional change data 604. Hereinafter, until a change fixing operation is performed, the content of an operation, for change in the designation frame, performed by the user is reflected in the provisional change data 604.

Next, in step S5, the processor 121 acquires the operation data 603. Next, in step S6, on the basis of the operation data 603, the processor 121 determines whether an operation for replacing the designation characters in the designation frames 301 with each other as described above has been performed. As a result of the determination, when an operation for replacing the designation characters in the designation frames 301 with each other has been performed (YES in step S6), the processor 121 executes a process of replacing the data of the two designation characters designated by the user with each other, on the provisional change data 604 in step S7. For example, when an instruction operation for replacing the first designation character and the second designation character with each other has been performed, the processor 121 executes a process of replacing the designation character information 553 and the special relationship level information 554 associated with the frame numbers 551 that are "1" and "2". Accordingly, replacement in the designation frames is performed, including the growth state of the special relationship level. On the other hand, the valid flag 552 is not replaced. Thus, when an instruction operation for replacing the first designation character and the second designation character with each other is performed during the normal period, the valid character/invalid character state is switched. That is, since the first designation character is moved from the valid designation frame 301 to the invalid designation frame 301, the first designation character becomes an invalid character, so that the above advantageous effect that has occurred so far no longer occurs. In addition, since the second designation character is moved from the invalid designation frame 301 to the valid designation frame 301, the second designation character becomes a valid character, so that the advantageous effect subsequently occurs.

Next, in step S12, the processor 121 generates a special relationship setting screen in which the display contents of the designation frames 301 are set, on the basis of the provisional change data 604, and outputs the special relationship setting screen to the display section 124. Thereafter, the processor 121 returns to step S5 and repeats the process.

On the other hand, as a result of the determination in step S6, when such a replacement operation has not been performed (NO in step S6), in step S8, the processor 121 determines whether a cancellation operation has been performed, on the basis of the operation data 603. The cancellation operation is an operation for cancelling designation of a designation character from any of the designation frames 301. As a result of the determination, when such a cancellation operation has been performed (YES in step S8), in step S9, the processor 121 performs a process of excluding the designation character from the designation frame 301 from which cancellation of the designation has been performed, on the provisional change data 604. For example, when an instruction operation for cancelling the designation of the third designation character has been performed, the processor 121 clears the designation character information 553 of the record, in the provisional change data 604, in which the frame number 551 is "3", and further initializes the special relationship level information 554. Thereafter, the processor 121 returns to step S12 and repeats the process.

On the other hand, as a result of the determination in step S8, when such a cancellation operation has not been performed (NO in step S8), in step S10, the processor 121 determines whether an operation for newly designating a fellow character (new designation operation) has been performed for the designation frame 301 that is in a valid state. Specifically, the processor 121 determines whether an operation for designating a fellow character in a valid empty frame has been performed, or an operation for newly designating a fellow character from the fellow list display area 303 has been performed for the valid designation frame 301 in which a fellow character has already been designated. As a result of the determination, when a new designation operation has been performed (YES in step S10), in step S11, the processor 121 performs a process of designating the designated fellow character in the designated designation frame 301, on the provisional change data 604. Specifically, the processor 121 sets the character ID 511 of the newly designated fellow character with respect to the designation character information 553 corresponding to the designated frame. In addition, in the case of a new designation operation for a frame that is in an already designated state, the processor 121 also initializes the special relationship level information 554. Thereafter, the processor 121 returns to step S12 and repeats the process.

Figure 16:
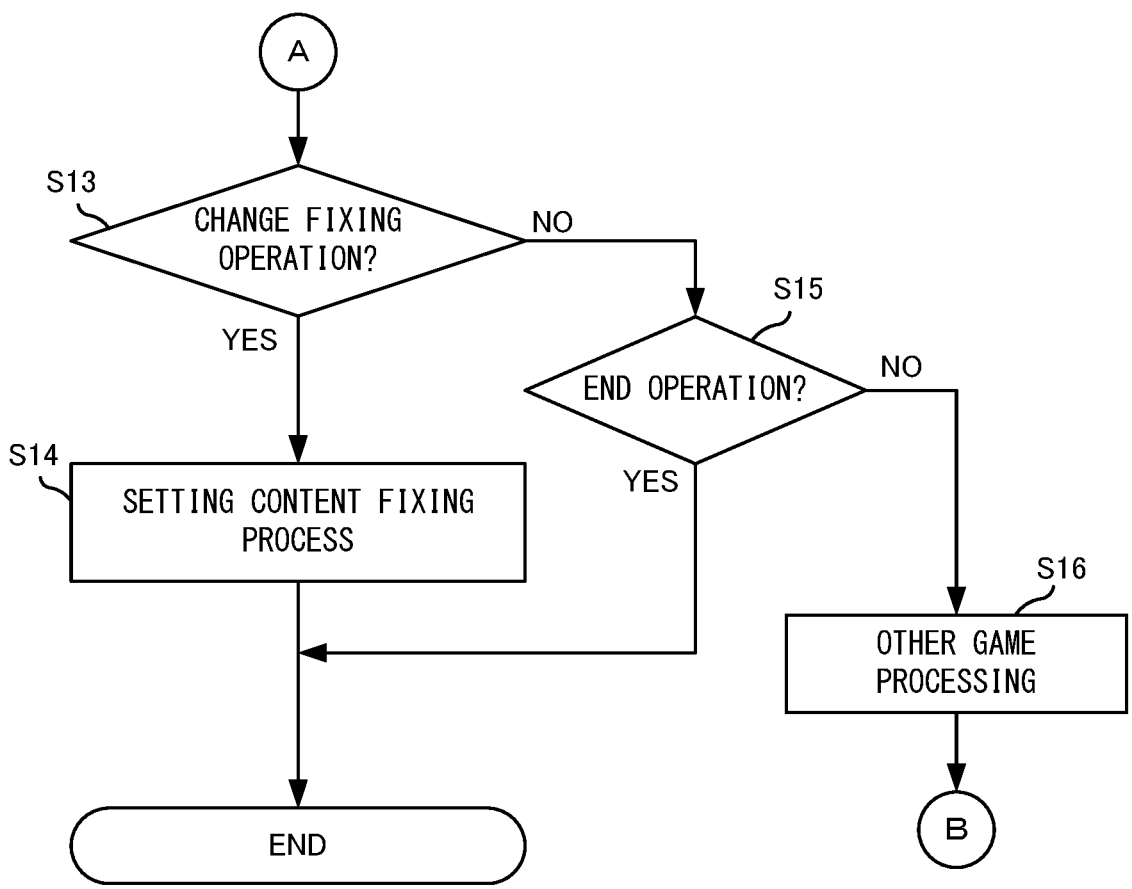
FIG. 16 is a flowchart showing the special relationship setting screen process in detail.

On the other hand, as a result of the determination in step S10, when a new designation operation has not been performed (NO in step S10), in step S13 in FIG. 16, the processor 121 determines whether an operation for fixing the change has been performed, on the basis of the operation data 603. Specifically, the processor 121 determines whether the determination button 305 has been operated. As a result of the determination, when the operation for fixing the change has been performed (YES in step S13), in step S14, the processor 121 fixes the content of the change related to the above various change operations by copying the contents of the provisional change data 604 to the designation frame data 534. Thereafter, the processor 121 ends the special relationship setting screen process. On the other hand, when the operation for fixing the change has not been performed (NO in step S13), in step S15, the processor 121 determines whether an operation for ending the special relationship setting screen, that is, an operation on the return button 304, has been performed. As a result, when such an operation has not been performed (NO in step S15), in step S16, the processor 121 executes other game processing corresponding to the operation content, and returns to step S12. For example, when the expansion button 302 has been operated, a process of making a transition to a screen for introducing the subscription service is executed. In addition, for example, when an operation for scrolling the fellow list display area 303 has been performed, the display contents in the fellow list display area 303 are changed in accordance with the scroll operation. On the other hand, as a result of the determination in step S15, when the return button 304 has been performed (YES in step S15), the processor 121 ends the special relationship setting screen process (without reflecting the content of the change made so far, in the designation frame data 534).

This is the end of the detailed description of the special relationship setting screen process according to the exemplary embodiment.

As described above, in the exemplary embodiment, by designating a fellow character in the designation frame 301, it is possible to improve the performance of the character and cause the game to proceed. By satisfying the predetermined condition such as subscription to the subscription service, the number of valid designation frames 301 can be increased. In addition, after the number of valid designation frames 301 is increased once, even when the number of valid frames is decreased since, for example, the predetermined condition is not satisfied, the information of the designated characters is maintained. Accordingly, for example, when a subscription is taken out to the subscription service, unsubscription is made once, and a subscription is then taken out to the subscription service again, the second and third designation characters can be validated with the special relationship levels thereof before the unsubscription (unless cancellation is performed before re-subscription) being maintained. Moreover, since the special relationship levels are maintained as described above, it is possible to validate the invalid character with the special relationship level thereof being maintained, by an operation for replacement in the designation frames as described above, even during the normal period. In addition to this, a character that is switched from a valid character to an invalid character as a result of the replacement operation can also be validated again with the special relationship level thereof being maintained. Furthermore, by enabling an operation for replacement in the designation frames during the normal period, strategic characteristics are given to the game in terms of which character is to be designated in the designation frame 301A during the normal period, so that the entertainment characteristics of the game can be enhanced. For example, a character to be designated in the designation frame 301A is changed in accordance with a map to be cleared.

In this example, since switching of valid/invalid is performed on the designation frames 301B and 301C, it can be said that the designation frame 301A is always in a valid state. In this example, the designation frame 301A is displayed so as to be larger than the other two frames (see FIG. 4). Accordingly, it is easier for the user to recognize that there is a possibility that the designation frames 301B and 301C are invalidated. In addition, when the user designates a fellow character that is desired to be designated by priority, in the designation frame 301A in advance, the user can save the time and effort for an operation for replacement in the frames during the normal period, so that the convenience of the user can be enhanced.

[Modifications]

The game to which the above processing is applied may be any game in which there are a plurality of frames in which the above designation characters can be designated, and is also applicable to role-playing games, simulation games, and the like.

As for the number of characters that can be designated as designation characters (that is, the number of designation frames 301), the number of designation frames 301 is up to three in the above exemplary embodiment, and the case where the number of designation frames in a valid state in the normal state is one has been described. The values are examples, and, in another exemplary embodiment, arbitrary numbers may be set (it should be noted that the number of valid designation frames in the normal state is set to be less than the maximum number of characters that can be designated).

In the above exemplary embodiment, the example in which the above ability parameter improvement effect does not occur for an invalid character during the normal period has been described. In another exemplary embodiment, the ability parameter improvement effect may occur even during the normal period, but the amount of the improvement may be made smaller than that during the frame expansion valid period. In addition, as for growth of the special relationship level, in the above exemplary embodiment, the case where the special relationship level does not grow in an invalid state has been described. However, the special relationship level is not limited thereto, and, in another exemplary embodiment, the special relationship level may grow even during the normal period, but the amount of the growth may be made smaller than that during the frame expansion valid period.

In the above exemplary embodiment, the example in which the special relationship level is initialized when designation of a designation character is cancelled, has been described. In another exemplary embodiment, when designation is cancelled, the special relationship level may be decreased without performing initialization (in other words, may be changed so as to be close to the initial value). In this case, the special relationship level may be stored so as to be associated with each fellow character in advance, and, when the designation of a designation character is cancelled, the special relationship level associated with this character may be decreased by a predetermined number (for example, by one).

In the above exemplary embodiment, the example in which a cancellation operation for a designation character in a designation frame that is in an invalid state is possible, has been described. However, in another exemplary embodiment, the cancellation operation may be disenabled for a designation character in a designation frame that is in an invalid state. That is, cancellation of designation may be possible only during the frame expansion valid period.

In the above exemplary embodiment, subscription to the monthly fee subscription service has been exemplified as the condition for increasing the number of valid designation frames. The condition for increasing the number of valid designation frames is not limited thereto, and another condition may be used. For example, the number of valid designation frames may be increased during a certain period on a condition that predetermined compensation is paid. As for payment of the compensation, in addition to the case of paying a fee, predetermined in-game currency or the like may be consumed (a compensation parameter may be consumed).

As for the method for designating the designation character, the example in which a designation character is designated on the basis of an operation of the user has been described in the above exemplary embodiment. However, a designation character may be automatically determined. For example, a user play history may be recorded in advance, and the processor 121 may automatically determine a character whose number of uses/frequency of use is large, as a "recommended character".

As for the subject that performs the processing as described above, there is no limitation to the above configuration. For example, in the above information processing system, a server 101-side system may include a plurality of information processing apparatuses, and the processing to be executed in the server 101-side system may be divided and performed by the plurality of information processing apparatuses. In addition, a main process of the series of processes executed by the information processing terminal 102 may be executed by the server-side apparatus, and a part of the series of processes may be performed by the information processing terminal 102. Moreover, a so-called cloud gaming configuration may be adopted. For example, the information processing terminal 102 may be configured to send the operation data 603 indicating the operation of the user, to the server 101, and the server 101 may be configured to execute various kinds of game processing and stream the execution results as video/audio to the information processing terminal 102. Furthermore, on the contrary, a single information processing apparatus may be configured to execute the above-described processing.

While the exemplary embodiments have been described in detail, the foregoing description is in all aspects illustrative and not restrictive. It is to be understood that numerous other modifications and variations can be devised without departing from the scope of the exemplary embodiments.

What is claimed is:
1. A processing system comprising:
a processor and a memory coupled thereto, the processor being configured to control the processing system to at least:

store, in the memory, an in-game object designated as a designation object among a plurality of in-game objects used by a user in a game;

generate, and display to a display screen that is coupled to the processor, a graphical user interface that concurrently includes: 1) a first section that includes a plurality of designation frames that each include an image of those ones of the plurality of in-game objects that have been designated as designation object(s), and 2) a second section that shows images for multiple ones of the plurality of in-game objects that are selectable as a designation object by the user;

determine a maximum designation number that is a maximum number of the in-game objects that can be designated as the designation object(s);

determine at least one in-game object, for which an image thereof is displayed in the second section, as a corresponding designation object under a condition that the number of the designation object(s) is equal to or less than the maximum designation number;

store, in the memory, whether the corresponding designation object is one of: 1) a valid object for which a predetermined state is valid, or 2) an invalid object for which the predetermined state is invalid;

determine a maximum valid number that is a maximum number of the valid objects and is equal to or less than the maximum designation number;

determine at least one of the designation object(s) as the valid object under a condition that the number of the valid objects is equal to or less than the maximum valid number;

store, in association with each valid object and each invalid object, an individual parameter;

cause gameplay of the game to be controlled in accordance with each individual parameter that is associated with each valid object and/or each invalid object;

update, based on gameplay of the game, the individual parameter associated with at least one of the valid object(s);

change the designation object to a non-designation object that is the in-game object that is not the designation object;

based on the maximum valid number being decreased from a first number to a second number, wherein the first number is equal to or greater than 2 and the second number is equal to or greater than 1, automatically change at least one of the valid objects to invalid while maintaining at least one other one of the valid objects as valid;

in the case where the designation object is changed to the non-designation object, change the individual parameter associated with the non-designation object to an initial value or change the individual parameter such that the individual parameter is close to the initial value; and based on the at least one of the valid objects being changed to be an invalid object: 1) maintain the individual parameter associated with the valid object immediately before being changed to the invalid object, and 2) automatically adjust how the image, which corresponds to in-game object that is now the invalid object, is shown within one of the plurality of designation frames.

2. The processing system according to claim 1, wherein the processor is further configured to control the processing system to change a second in-game object from the invalid object to the valid object on a condition that a first in-game object is changed from the valid object to the invalid object.

3. The processing system according to claim 1, wherein the processor is further configured to control the processing system to, in the case where the in-game object is the valid object, cause an effect that is more advantageous in the game than in the case where the in-game object is any of the non-designation object and the invalid object, to occur for the valid object.

4. The processing system according to claim 1, wherein, in the changing the individual parameter, in the case where the in-game object is the invalid object, in accordance with play of the game, the processor is configured to control the processing system not to change the individual parameter associated with the invalid object, or to change the individual parameter such that the change is smaller than that in the case where the in-game object is the valid object.

5. The processing system according to claim 1, wherein the processor is further configured to control the processing system to change a set display order in a predetermined screen of the valid objects on the basis of a predetermined user input, and
in the determining the valid object, in the case where the maximum valid number is decreased from the first number to the second number, the processor is configured to control the processing system to change the valid object in a specific display order to the invalid object.

6. The processing system according to claim 1, wherein the processor is further configured to control the processing system to receive a user input for changing the invalid object to the valid object.

7. The processing system according to claim 1, wherein the processor is configured to control the processing system to determine at least one designation object under a condition that a designation possible number of the designation objects is equal to or less than the maximum designation number and equal to or less than the maximum valid number, and the designation possible number is the number of the in-game objects that can be designated as the designation object.

8. The processing system of claim 1, wherein the processor is further configured to control the processing system to:
based on the maximum valid number being decreased from a first number to a second number, maintain how the second number of the valid objects are displayed within the plurality of designation frames.

9. The processing system of claim 1, wherein the game is executable in one of first and second game modes, and wherein the maximum designation number differs when the game is being executed in the first game mode compared to the second game mode.

10. The processing system of claim 9, wherein the maximum designation number is no less than one, regardless of whether the game is being executed in the first game mode or the second game mode; and wherein the maximum designation number is greater when the game is being executed in the first game mode compared to when the game is being executed in the second game mode.

11. The processing system of claim 10, wherein the processor is further configured to control the processing system to change a second in-game object from the invalid object to the valid object on a condition that a first in-game object is changed from the valid object to the invalid object.

12. The processing system of claim 1, wherein a first one of the plurality of designation frames is larger than at least one other one of the plurality of designation frames.

13. The processing system of claim 12, wherein each of the plurality of designation frames has a state that is one of a valid state and an invalid state, wherein the processor is further configured to control the processing system to:
automatically change the state of at least one of the designation frames to the invalid state based on the maximum valid number being decreased from the first number to the second number; and
in conjunction with the change of the state, automatically adjust how the at least one of the designation frames is displayed within the first section.

14. The processing system of claim 13, wherein the processor is further configured to control the processing system to:
process an instruction provided from a user to switch from a first mode to a second mode, wherein the maximum valid number is increased from the second number to the first number;
based on the instruction, automatically switching the state of the designation frames to the valid state and correspondingly changing how the designation frames are displayed within the first section.

15. A non-transitory computer-readable storage medium having stored therein instructions that, when executed by a processor of an information processing apparatus, cause the information processing apparatus to:
store an in-game object designated as a designation object, among a plurality of in-game objects used by a user in a game;
generate, and display to a display screen that is coupled to the processor, a graphical user interface that concurrently includes: 1) a first section that includes a plurality of designation frames that each include an image of those ones of the plurality of in-game objects that have been designated as designation object(s), and 2) a second section that shows images for multiple ones of the plurality of in-game objects that are selectable as a designation object by the user;
determine a maximum designation number that is a maximum number of the in-game objects that can be designated as the designation object(s);
determine at least one in-game object, for which an image thereof is displayed in the second section, as a corresponding designation object under a condition that the number of the designation objects is equal to or less than the maximum designation number;
store whether the corresponding designation object is one of: 1) a valid object for which a predetermined state is valid, or 2) an invalid object for which the predetermined state is invalid;
determine a maximum valid number that is a maximum number of the valid objects and is equal to or less than the maximum designation number;
determine at least one of the designation object(s) as the valid object under a condition that the number of the valid objects is equal to or less than the maximum valid number;
store, in association with each valid object and each invalid object, an individual parameter;
cause gameplay of the game to be controlled in accordance with each individual parameter that is associated with each valid object and/or each invalid object;
update, based on gameplay of the game, the individual parameter associated with at least one of the valid object(s);

change the designation object to a non-designation object
that is the in-game object that is not the designation
object;
based on the maximum valid number being decreased
from a first number to a second number, wherein the
first number is equal to or greater than 2 and the second
number is equal to or greater than 1, automatically
change at least one of the valid objects to invalid while
maintaining at least one other one of the valid objects
as valid;
in the case where the designation object is changed to
the non-designation object, change the individual
parameter associated with the non-designation object
to an initial value or change the individual parameter
such that the individual parameter is close to the
initial value; and
based on the at least one of the valid objects being
changed to be an invalid object: 1) maintain the
individual parameter associated with the valid object
immediately before being changed to invalid, and 2)
automatically adjust how the image, which corresponds to in-game object that is now the invalid
object, is shown within one of the plurality of
designation frames.

16. An information processing apparatus comprising:
a processor and a memory coupled thereto, the processor
being configured to control the information processing
apparatus to at least:
store, in the memory, an in-game object, which is one of
a plurality of in-game objects, as being designated by
a user in a video game;
generate, and display to a display screen that is coupled to
the processor, a graphical user interface that concurrently includes: 1) a first section that includes a plurality of designation frames that each include an image
of those ones of the plurality of in-game objects that
have been designated by the user, and 2) a second
section that shows images for multiple ones of the
plurality of in-game objects;
obtain a maximum designation number of the plurality of
in-game objects that can be designated by the user;
store, in the memory, whether the in-game object, which
has been designated, is valid or invalid
obtain a maximum valid number of the plurality of
in-game objects that can be valid, wherein the maximum valid number is equal to or less than the maximum designation number;
determine the in-game object, which has been designated,
is also valid under a condition that the number of the
plurality of in-game objects that are valid is equal to or
less than the maximum valid number;
store, in association with each one of the plurality of
in-game objects, an individual parameter;
cause gameplay of the video game to be controlled in
accordance with each individual parameter that is associated with each corresponding one of the plurality of
in-game objects;
update, based on gameplay of the game, the individual
parameter associated with at least one of the plurality of
in-game objects that is valid;
based on the maximum valid number being decreased
from a first number to a second number, wherein the
first number is equal to or greater than 2 and the second
number is equal to or greater than 1, automatically
change at least one of the plurality of in-game objects
that are valid to be invalid while maintaining at least
one other one of the plurality of in-game objects as
valid;
based on one of the plurality of in-game objects that has
been designated being changed to non-designated,
automatically change the individual parameter, which
is associated with the one of the plurality of in-game
objects that has been changed to non-designated, to an
initial value or another value that is close to the initial
value; and
based on one of the plurality of in-game objects that has
been valid being changed to invalid: 1) maintain the
individual parameter, which is associated with the one
of the plurality of in-game objects that has been
changed to invalid, immediately before being changed
to invalid, and 2) automatically adjust how the image,
which is associated with the one of the plurality of
in-game objects that has been changed to invalid, is
shown within one of the plurality of designation
frames.

17. An information processing method executed by a
computer configured to control an information processing
system, the information processing method causing the
information processing system to:
store an in-game object designated as a designation
object, among a plurality of in-game objects used by a
user in a game;
generate, and display to a display screen that is coupled to
the computer, a graphical user interface that concurrently includes: 1) a first section that includes a plurality of designation frames that each include an image
of those ones of the plurality of in-game objects that
have been designated as designation object(s), and 2) a
second section that shows images for multiple ones of
the plurality of in-game objects that are selectable as a
designation object by the user;
determine a maximum designation number that is a maximum number of the in-game objects that can be designated as the designation object(s);
determine at least one in-game object, for which an image
thereof is displayed in the second section, as a corresponding designation object under a condition that the
number of the designation object(s) is equal to or less
than the maximum designation number;
store whether the corresponding designation object is one
of: 1) a valid object for which a predetermined state is
valid, or 2) an invalid object for which the predetermined state is invalid;
determine a maximum valid number that is a maximum
number of the valid objects and is equal to or less than
the maximum designation number;
determine at least one of the designation object(s) as the
valid object under a condition that the number of the
valid objects is equal to or less than the maximum valid
number;
store, in association with each valid object and each
invalid object, an individual parameter;
cause gameplay of the game to be controlled in accordance with each individual parameter that is associated
with each valid object and/or each invalid object;
update, based on gameplay of the game, the individual
parameter associated with at least one of the valid
object(s);
change the designation object to a non-designation object
that is the in-game object that is not the designation
object;

based on the maximum valid number being decreased from a first number to a second number, wherein the first number is equal to or greater than 2 and the second number is equal to or greater than 1, automatically change at least one of the valid objects to invalid while maintaining at least one other one of the valid objects as valid;

in the case where the designation object is changed to the non-designation object, change the individual parameter associated with the non-designation object to an initial value or change the individual parameter such that the individual parameter is close to the initial value; and based on the at least one of the valid objects being changed to be an invalid object: 1) maintain the individual parameter associated with the valid object immediately before being changed the invalid object, and 2) automatically adjust how the image, which corresponds to in-game object that is now the invalid object, is shown within one of the plurality of designation frames.

\* \* \* \* \*